Nov. 20, 1945.　　　J. L. AASLAND　　　2,389,478
CORN PICKER
Filed Oct. 26, 1942　　　3 Sheets-Sheet 1
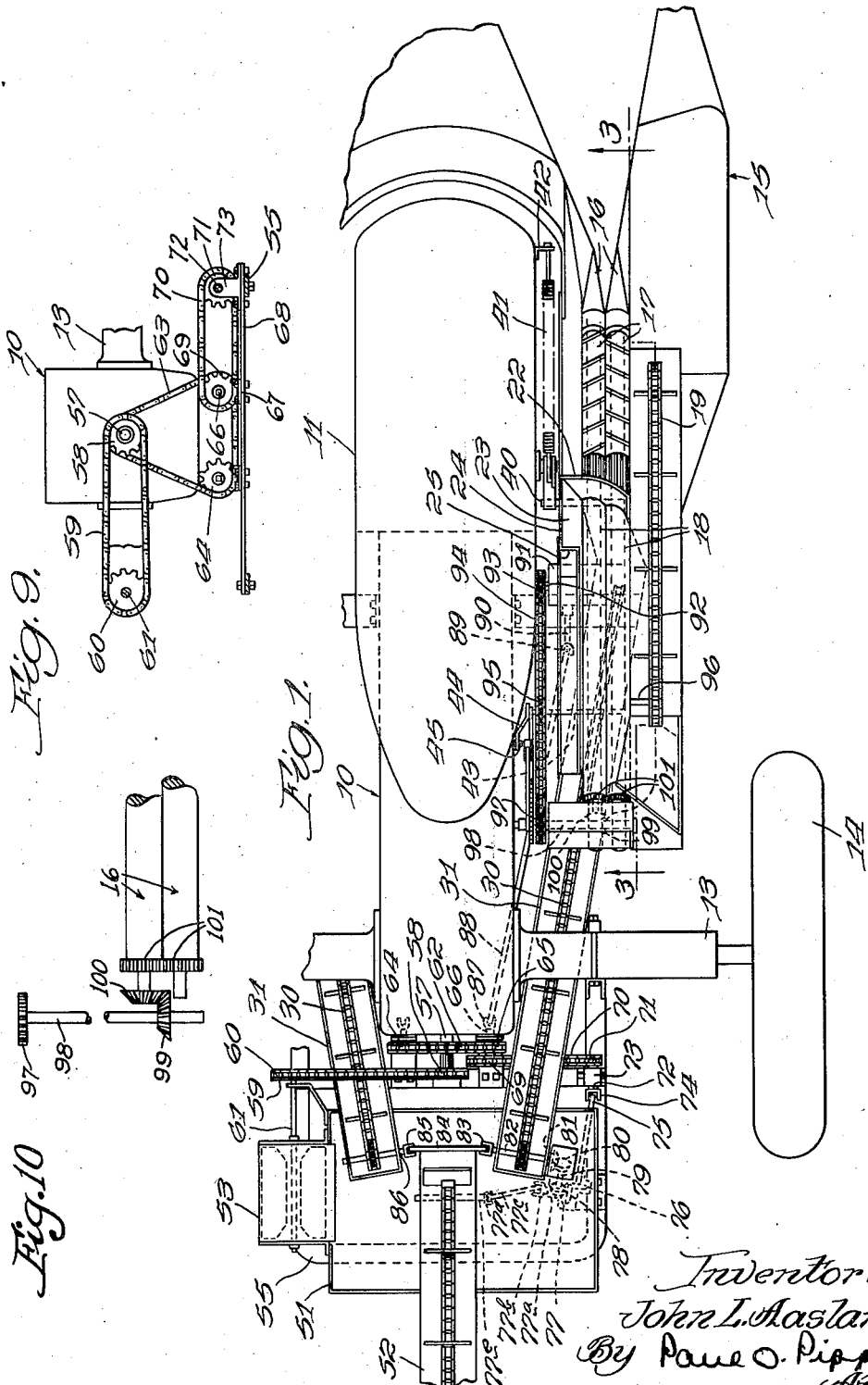
Inventor:
John L. Aasland.
By Paul O. Pippel
Atty.

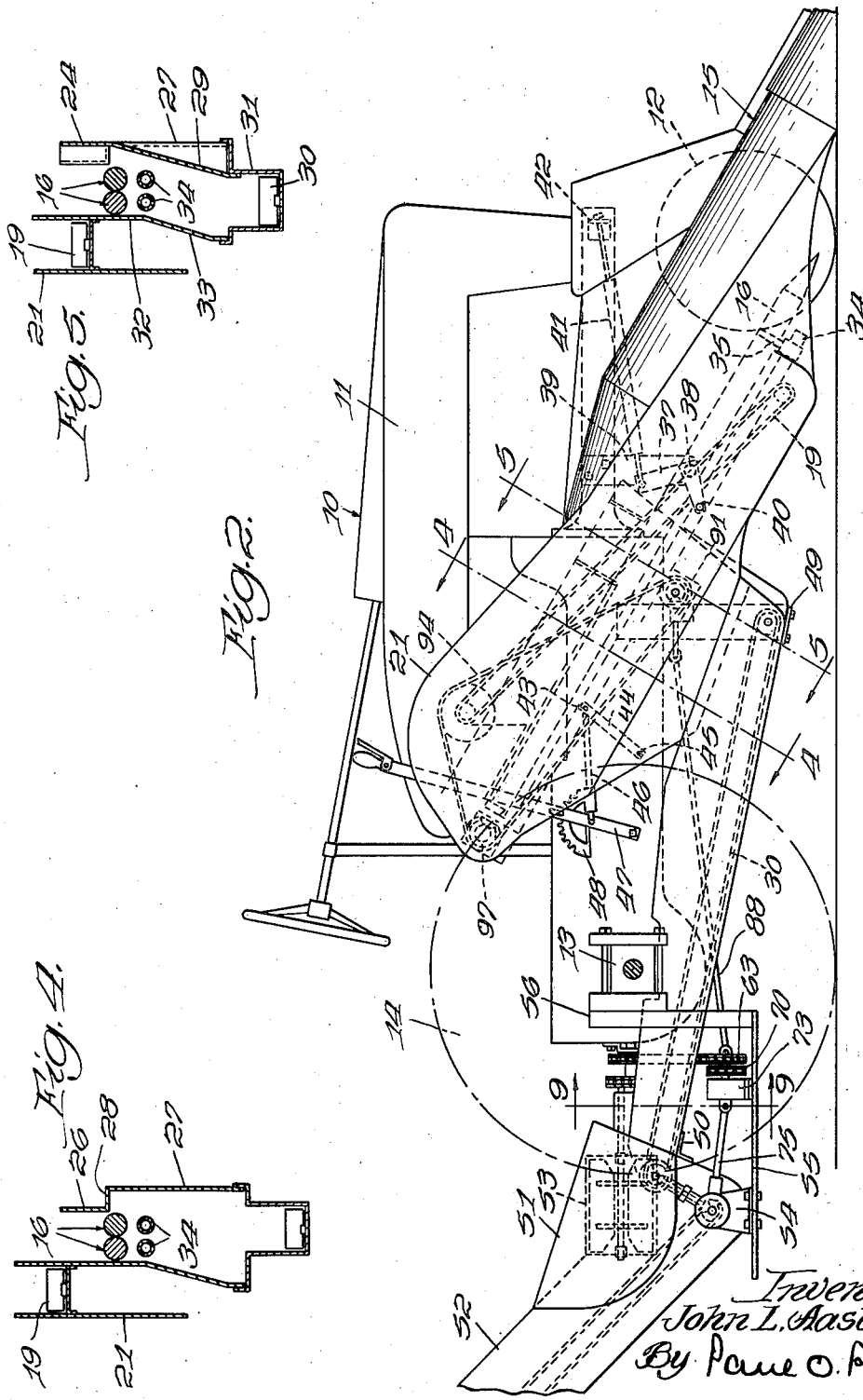

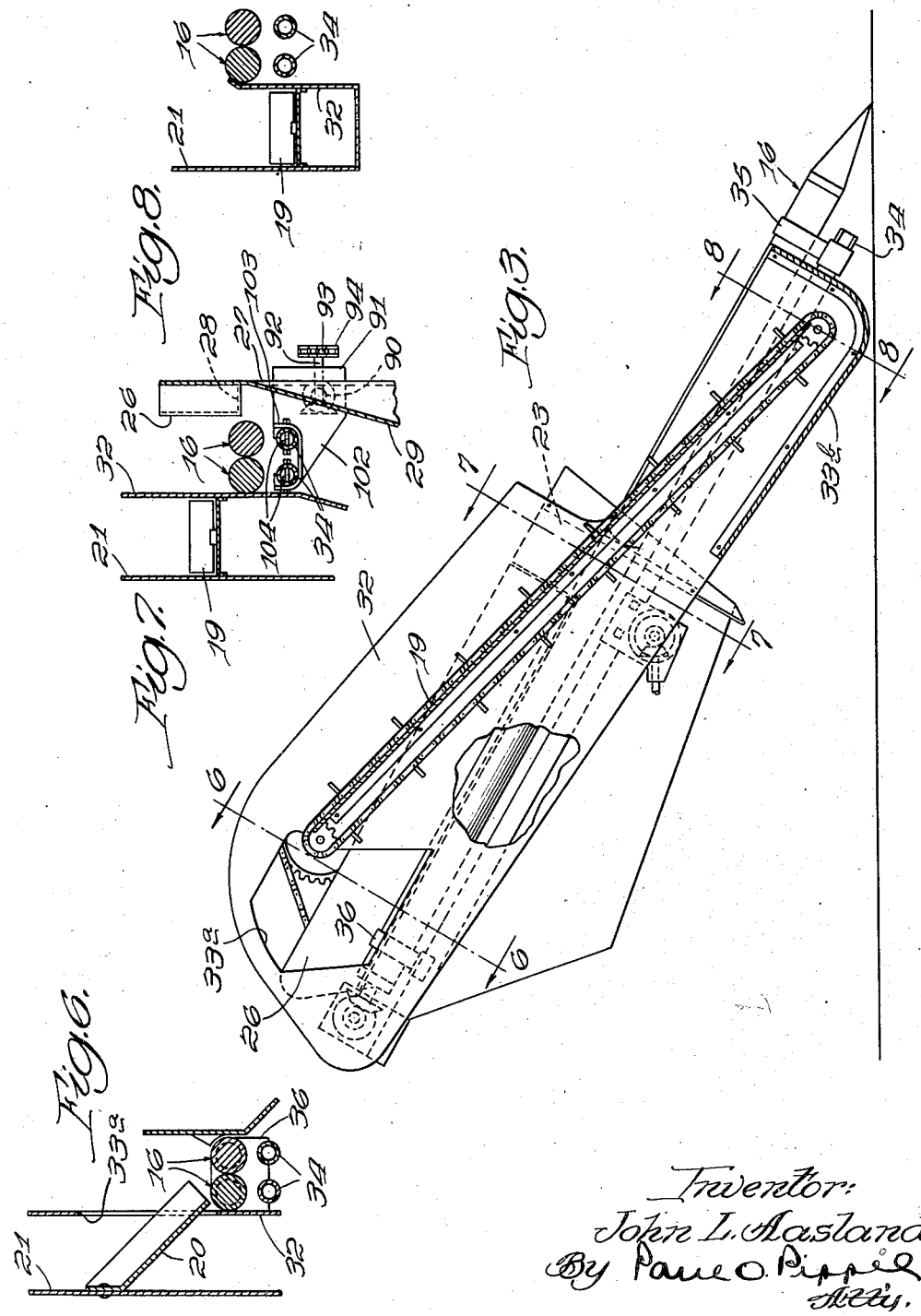

Patented Nov. 20, 1945

2,389,478

UNITED STATES PATENT OFFICE 2,389,478

CORN PICKER

John L. Aasland, Moline, Ill., assignor to International Harvester Company, a corporation of New Jersey Application October 26, 1942, Serial No. 463,369

15 Claims. (Cl. 56—18)

This invention relates to a harvester. More specifically, it realtes to a tractor-mounted corn picker.

Corn pickers are frequently quite heavy and very complicated in their construction, because the separate snapping rolls and husking rolls require separate drives and mountings. In constructions in which the husking rolls are formed as extensions of the snapping rolls for the sake of simplification, the corn being husked is forced to move in an upward direction along the husking rolls because of the upward inclination of the snapping rolls. This may make husking a difficult operation. Considering for the moment tractor-mounted corn pickers, apart from whether the husking rolls are formed as extensions of the snapping rolls or completely separate therefrom, a tractor-mounted picker may be difficult to detach from and attach to a tractor, since various parts thereof normally extend over the tractor rear axle. By the present invention an arrangement of parts is had involving the formation of husking rolls as extensions of the snapping rolls by which the corn picker is more easily attached and detached from the tractor.

An object of the present invention is to provide an improved harvester.

A further object is the provision of an improved tractor-mounted corn picker.

Another object is to provide an improved corn picker involving the formation of husking rolls as extensions of the snapping rolls.

A still further object is the provision of an improved corn picker by which corn is conveyed beneath the axle of the tractor upon which the picker is mounted.

Other objects will appear from the disclosure.

According to the present invention, a pair of rolls is mounted at one side of a tractor body forward of the rear axle, each roll having a snapping section at the forward end thereof and a husking section at the rear end thereof. Corn is snapped by the snapping sections of the rolls in the usual manner and is conveyed to the upper rear end of the husking sections and is caused to move downwardly along the husking sections in a direction toward the snapping sections. The husked corn is deposited upon a conveyer adjacent the juncture of the snapping sections and the husking sections and is conveyed rearwardly beneath the rear axle of the tractor to a point to the rear of the rear axle, where a wagon elevator receives it and raises it upwardly and discharges it into a wagon.

In the drawings:

Figure 1 is a plan view, with certain parts omitted, of a corn picker of the present invention mounted upon a tractor;

Figure 2 is a side view of the corn picker mounted upon the tractor with one wheel removed and the axle shown in section;

Figure 3 is a sectional view taken along the line 3—3 of Figure 1, showing the corn picker of the present invention;

Figures 4 and 5 are sectional views taken respectively on the lines 4—4 and 5—5 of Figure 2;

Figures 6, 7, and 8 are sectional views taken respectively on the lines 6—6, 7—7, and 8—8 of Figure 3; and Figure 9 is a sectional view taken on the line 9—9 of Figure 2 with certain parts omitted;

Figure 10 is an enlarged detail of the roll drive mechanism.

The reference character 10 designates a tractor which comprises a narrow body 11, a narrow front rolling support 12, an extended rear axle 13, and wheels 14 at the end of the axle, of which only one is shown. Mounted upon the tractor 10 is a two-row corn picker, of which the mechanism for only one row is shown, except for certain parts at the rear of the tractor, since the mechanism of the other row is identical. The reference character 15 designates the corn harvesting unit for one row positioned at the right side of the tractor body 11. This includes essentially a pair of rolls 16 which slope downwardly toward the front of the tractor 10. Each roll 16 includes at its lower forward end a snapping section 17 and at its upper end a husking section 18. An ear conveyer 19 extends along almost the entire length of the rolls 16, being lower than the lower forward end of the rolls opposite the snapping section 17 and higher than the upper end of the rolls opposite the husking sections 18, as shown in Figures 2 and 3. The conveyer 19 is adapted to convey ears snapped by the snapping sections 17 upwardly alongside the rolls and to discharge them upon a sidewise sloping chute 20 secured in a side wall 21 of the conveyer 19. From the chute 20 the ears fall onto the upper ends of the husking sections 18. They move downwardly along the husking sections 18 toward the snapping sections 17 while being husked. A transverse wall 22 at the juncture between the snapping sections 17 and husking sections 18 prevents the husked ears from continuing down onto the snapping sections 17. Instead, the ears pass from the husking sections 18 downwardly through an opening 23 bounded by the transverse wall 22, a side wall 24, and a transverse part 25 extending between the side wall 24, which is spaced laterally from the husking sections 18 to a side sheet 26 extending along the husking sections 18 immediately adjacent thereto on the side toward the tractor body 11. As seen in Figure 4, the side sheet 26 includes a lower part 27 laterally displaced from the upper portion thereof immediately adjacent the husking sections 18 and joined to the upper portion by a horizontal part 28. In effect, the transverse wall at the lower end of the husking sections 18 is in alinement with the portion 27, as will be seen from Figure 5, although the lower portion 29 of the side wall 24 slopes sidewardly toward a position beneath the husking sections 18 in order to guide ears falling through the opening 23 into a conveyer 30 positioned within a metallic shell or trough 31. The ear forwarder 19 has been stated to have one side sheet 21 to which the chute 20 is secured, as indicated in Figure 6. This conveyer also has an inner side sheet 32 adjacent the husking sections 18, which has a lower portion 33 sloping outwardly and engaging the metallic trough 31. It will be seen that the lower portion 27 of the side sheet 26 also engages the metallic trough 31 in which the conveyer 30 is positioned. The side sheet 32 extends the length of the conveyer 19 and is relatively narrow adjacent the forward end and is relatively wide at the rear end, all as seen in Figure 3. The upper rear end of the sheet 32 has an opening 33a through which the chute 20 extends. Figure 3 shows a curved piece 33b secured to the forward lower end of the side sheet 32. This piece is also secured to the forward lowered end of the sheet 21 and serves to space sheets 21 and 32 from one another.

The rolls 16 are supported by pipes 34 positioned therebelow. At the lower end of the pipes 34 a bearing bracket 35 is secured, which rotatably supports the lower end of the rolls 16. The upper ends of the rolls are rotatably supported on the pipes by a similar bearing bracket 36.

The corn harvesting unit is mounted at its lower end upon the tractor by means of a bell-crank 37, which is pivotally supported at 38 on a bracket 39 secured to the tractor body 11. One arm of the bell-crank 37 is pivotally connected by a transverse member 40 to the supporting tubes 34 and the other arm of the bell-crank has connected thereto a counterbalancing spring 41, which is also connected to a retaining bracket 42 secured to the front end of the tractor. The upper end of the corn harvesting unit is pivotally carried upon a transverse member 43 secured to the tubes 34 and carried by a link 44 pivoted at 45 to the tractor body 11. A link 46 connects the link 44 to a detent lever 47, which carries detent mechanism engageable with an arcuate dentate member 48 secured to the link 46 so as to fix the angle between the link 46 and the detent lever 47 and the angle between the links 44 and 46 and consequently the position of the corn harvester unit with respect to the tractor 10.

As previously stated, ears of corn husked by the husking sections 18 are to be discharged through the opening 23 into the metallic trough 31 onto the conveyer 30. The forward end of the conveyer 30 and the trough 31 are supported by an extended bracket 49 secured to the tractor body. The conveyer 30 and the trough 31 extend rearwardly from and beneath the rolls 16 beneath the rear axle 13 and are supported at the rear end by an angle member 50 upon a trough 51. Actually the trough 31 extends through an opening in the front side of the trough 51, which is connected to an upwardly and rearwardly extending wagon elevator 52 and serves to guide ears of corn discharged from the rear end of the conveyer 30 onto the lower end of the wagon elevator 52. At the left side of the tractor and at the rear thereof, as viewed in Figure 1, there is a similar elevator 30 and containing trough 31 which is adapted to convey ears of corn from a corn harvesting unit, not shown, at the left side of the tractor 10 beneath the rear axle 13 into the trough 51. Mounted at the left side of the trough 51 is a fan 53 which is adapted to direct a blast of air across the trough 51, which will blow husks and leaves from ears of corn as they are being discharged from the conveyers 30 into the trough 51 and onto the wagon elevator 52. The trough 51 and wagon elevator 52 are carried on brackets 54, of which only one is shown, secured upon a U-shaped draw-bar 55 secured at the rear of and below the rear axle 13 by structure indicated by the reference character 56.

Figures 1 and 9 show that at the rear end of the tractor 10 there is a power take-off shaft 57 which drives the various parts of the units described. As illustrated in these figures, a sprocket 58 is secured to the shaft 57 and is engaged by a chain 59 which also engages a sprocket 60 secured upon a shaft 61 driving the fan 53. A sprocket 62, secured to the power take-off shaft 57, is engaged by a chain 63, which also engages a sprocket 64 and a sprocket 65. The sprocket 65 is secured to a shaft 66 journaled in a bracket 67 secured to a transverse strap 68 secured to and extending across the U-shaped draw-bar 55. Secured to the shaft 66 is a sprocket 69 engaged by a chain 70, engaging in turn a sprocket 71 secured to a shaft 72 mounted in a bracket 73 secured to the U-shaped draw-bar 55. The shaft 72 is connected by a universal joint 74 with a shaft 75 carrying a bevel gear 76 meshing with a double bevel gear 77. To the gear 77 is connected a shaft 77a connected by a universal joint 77b to a shaft 77c connected by a universal joint 77d with a shaft 77e driving the wagon elevator 52. A bevel gear 78 meshes with the double bevel gear 77 and is secured to a shaft 79, upon which is secured a bevel gear 80 meshing with a bevel gear 81 driving a shaft 82 forming the drive for the conveyer 30 at the right-hand side of the tractor. The shaft 82 is connected by a universal joint 83 with a shaft 84, in turn connected through a universal joint 85 with a shaft 86 driving the conveyer 30 at the left-hand side of the tractor.

The shaft 66 is connected through a universal joint 87 with a shaft 88 connected in turn by a universal joint 89 to a shaft 90, which extends into a gear-box 91. Extending from the gear-box 91 is a shaft 92 on which is secured a sprocket 93. A chain 94 meshes with a sprocket 95 on a shaft 96, which drives the ear elevator 19. The chain 94 also meshes with a sprocket 97 secured to a shaft 98, upon which is secured a bevel gear 99 meshing with a bevel gear 100 secured to the upper end of one roll 16. The upper ends of the rolls 16 have gear sections 101 which mesh with one another and thereby transmit drive from one roll to another. The gear box 91 extends through and is supported by the portion 27 of the sheet 26. The gear box 91 has a lateral extension 102 provided with a flange 103 which embraces the pipes 34 and is secured thereto by bolts 104.

It will be apparent from the foregoing description that a new and novel corn picker construction has been provided. By this construction husking sections 18 are formed as extensions of the snapping sections 17 on the rolls 16, and corn ears snapped by the snapping sections 17 are conveyed upwardly therefrom to the upper rear end of the husking sections 18. The corn ears move downwardly along the husking sections 18 and are discharged through the opening 23 at the lower end of the husking sections onto the conveyer 30, which conveys them rearwardly beneath the rear axle of the tractor to the trough 51 at the rear of the tractor, by which they are guided into the wagon elevator 52. One novel feature of the present invention consists in the feeding downwardly of ears to be husked along husking sections which are formed as extensions of the snapping rolls. In previous constructions, which have involved the formation of husking rolls as extensions of snapping rolls, the corn ears have been fed upwardly along the husking rolls and this has provided considerable difficulty, since it is difficult to feed ears upwardly along husking rolls and particularly difficult to effect a proper husking of the ears while forcing the ears upwardly at the constant speed of a conveyer chain. Applicant has solved this difficulty by feeding ears downwardly along husking sections in the manner employed with husking rolls which are separate from snapping rolls, and yet has maintained the advantages of simplified construction resulting from the formation of husking rolls as extensions of of the snapping rolls. Furthermore, it should be noted that in applicant's construction the ears of corn are discharged from the husking sections at their forward ends rather than at their rearward ends, as is the case with the constructions heretofore developed, and the result of this is that the husked ears may easily be conveyed beneath the tractor rear axle, as by the conveyer 30 mounted in the trough 31. It would be extremely difficult to convey ears from the rear ends of the husking sections beneath the tractor axle, since the rear ends of the husking sections are always as far to the rear of the tractor as the rear axle and are somewhat higher than the rear axle. As just stated, ears of corn are transferred from in front of the tractor rear axle to the rear of the tractor rear axle by a conveyer which extends beneath the rear axle. It should also be noted that the rear ends of the rolls 16 are somewhat forward of the rear axle 13, and thus the rolls do not extend across the rear axle. Thus there is no structure of the corn picker extending across the rear axle 13, and the problem of detaching the picker from the tractor is considerably simplified, for the rear axle does not interfere with lowering of the corn picker mechanisms to the ground.

The intention is to limit the invention only within the scope of the appended claims.

What is claimed is:

1. In a tractor having a rear axle, the combination of gathering means positioned forward of the rear axle, means mounting the gathering means on the tractor, husking means positioned forward of the rear axle and immediately adjacent the gathering means and adapted to husk crops gathered by the gathering means by the passing of the crops along said husking means in a direction toward the gathering means from a point spaced from the gathering means to a point immediately adjacent the gathering means, means for conveying crops from the gathering means directly and out of contact with the husking means to a location on the husking means spaced from the gathering means, means mounting the husking means on the tractor, means for conveying husked crops from a point on the husking means immediately adjacent the gathering means beneath the rear axle to the rear of the tractor, and means mounting the conveying means on the tractor.

2. The combination with a rotatable snapping means, a rotatable husking means, and means mounting the snapping means and the husking means so that axes of rotation of the snapping means and the husking means are generally in alinement and have the same slope, and the snapping means is lower than the husking means, of means for conveying ears of corn snapped by the snapping means directly and out of contact with the husking means to the end of the husking means away from the snapping means and higher than the remainder of the husking means, whereby the ears of corn may move downwardly along the husking means during the husking operation in the direction toward the snapping means.

3. In combination, a pair of rolls each comprising a snapping section and a husking section, supporting means, means rotatably mounting the rolls on the supporting means so that the rolls slope and the snapping sections are lower than the husking sections, and means for conveying ears of corn snapped by the snapping sections directly and out of contact with the husking sections to the end of the husking sections away from the snapping sections and higher than the remainder of the husking sections, whereby the ears may move downwardly along the husking sections for husking in a direction toward the snapping sections.

4. The combination with a pair of rolls each comprising a husking section and a snapping section and means rotatably mounting the rolls so that they slope and the snapping sections are at the lower end, of conveying means for transferring ears of corn snapped by the snapping sections directly and out of contact with the husking sections to the end of the husking sections away from the snapping sections and higher than the remainder of the snapping sections, whereby the ears may move downwardly along the husking sections in the direction toward the snapping sections, and means between the husking section and the snapping section for deflecting the husked ears.

5. In combination with tractor having a rear axle, snapping-roll sections positioned toward the front of the tractor, husking-roll sections rearward of the snapping-roll sections and forward of the rear axle, and means rotatably mounting the sections on the tractor so that their axes slope downwardly toward the front of the tractor, a first conveying means for conveying corn ears snapped by the snapping-roll sections directly and out of contact with the husking-roll sections to the upper end of the husking-roll sections, whereby the corn ears move downwardly along the husking-roll sections toward the snapping-roll sections during the husking operation, means mounting the conveying means on the tractor, and a second conveying means for conveying corn from the forward end of the husking-roll sections beneath the rear axle to the rear of the rear axle.

6. In combination with tractor having a body and a rear axle, a pair of rolls positioned forward of the rear axle at the side of the tractor body and sloping downwardly toward the front of the tractor, each roll comprising a snapping section and a husking section rearward of the snapping section, means rotatably mounting the rolls on the tractor, a first conveying means independent of the husking sections extending from the snapping sections to the upper and rearward end of the husking sections, means mounting the first conveying means on the tractor, a second conveying means extending from the lower and forward end of the snapping sections beneath the rear axle to a point rearwardly thereof, and means mounting the second conveying means on the tractor, whereby corn ears snapped by the snapping sections are conveyed out of contact with the husking sections to the upper end of the husking sections, are husked in moving down the husking sections toward the snapping sections, and are conveyed from the lower end of the snapping sections beneath the tractor axle to the rear thereof.

7. In combination, a frame, a pair of rolls having snapping sections and husking sections, means mounting the rolls on the frame on a slope with the snapping sections at the lower end of the rolls, an elevator extending along the rolls at a steeper slope than the rolls so as to have its lower end lower than the lower end of the rolls and its upper end higher than the upper ends of the rolls and serving to move corn ears snapped by the snapping sections directly and out of contact with the husking sections to the upper end of the husking sections to enable the ears to move downwardly from the upper end of the husking sections along the husking sections for husking, and means mounting the elevator on the frame.

8. In combination, a pair of sloping rolls having snapping sections at the lower end and husking sections at the upper end, a frame, means rotatably mounting the rolls on the frame, a first conveyor for transferring corn ears snapped by the snapping sections directly and out of contact with the husking sections to the upper end of the husking sections to enable the corn ears to be husked by moving downwardly along the husking sections toward the snapping sections, means mounting the first conveyor on the frame, means positioned at the juncture of the husking sections and the snapping sections for preventing corn ears having moved downwardly along the husking sections from passing onto the snapping sections, means mounting said last-mentioned means on the frame, a second conveyor having its receiving end beneath the lower end of the husking sections, means mounting the second conveyor on the frame, means for guiding husked ears from the lower end of the husking sections to the receiving end of the second conveyor, and means mounting the last-mentioned means on the frame.

9. In combination with tractor having a rear axle, a pair of rolls positioned in front of the rear axle and sloping downwardly toward the front of the tractor and having snapping sections at their lower forward end and husking sections at their upper rearward end, means rotatably mounting the rolls on the tractor, a first conveyor extending along the rolls for transferring ears snapped by the snapping sections directly and out of contact with the husking sections to the upper end of the husking sections to enable the ears to move downwardly along the husking sections toward the snapping sections for husking, means mounting the first conveyor on the tractor, a second conveyor extending from beneath the lower end of the husking sections and forwardly of the rear axle rearwardly beneath the rear axle to the rear of the rear axle, and means mounting the second conveyor on the tractor.

10. In combination with tractor having a rear axle, a pair of rolls positioned in front of the rear axle and sloping downwardly toward the front of the tractor and having snapping sections at their lower forward end and husking sections at their upper rearward end, means rotatably mounting the rolls on the tractor, a first conveyor extending along the rolls for transferring ears snapped by the snapping sections directly and out of contact with the husking sections to the upper end of the husking sections to enable the ears to move downwardly along the husking sections toward the snapping sections for husking, means mounting the first conveyor on the tractor, a wall extending transversely across the rolls at the juncture between the husking sections and the snapping sections for preventing husked ears having moved downwardly along the husking sections from passing into the snapping sections, means mounting the wall on the tractor, a second conveyor extending from beneath the lower end of the husking sections and forwardly of the rear axle rearwardly beneath the rear axle to the rear of the rear axle, means mounting the second conveyor on the tractor, means for guiding husked ears from the lower end of the husking sections to the second conveyor therebeneath, and means mounting the said last-mentioned means on the tractor.

11. In combination with tractor having a rear axle, a pair of rolls positioned in front of the rear axle and sloping downwardly toward the front of the tractor and having snapping sections at their lower forward end and husking sections at their rearward end, means rotatably mounting the rolls on the tractor, an elevator extending along the rolls at a steeper slope than the rolls so as to have its lower end lower than the lower end of the rolls and its upper end higher than the upper end of the rolls and serving to move corn ears snapped by the snapping sections out of contact with the husking sections to the upper end of the husking sections to enable the ears to move downwardly from the upper end of the husking sections along the husking sections for husking, means mounting the elevator upon the tractor, a conveyor extending from beneath the lower end of the husking sections and forwardly of the rear axle rearwardly beneath the rear axle to the rear of the rear axle, and means mounting the conveyor on the tractor.

12. In combination with tractor having a rear axle, a pair of rolls positioned in front of the rear axle and sloping downwardly toward the front of the tractor and having snapping sections at the lower forward end and husking sections at their upper rearward end, means rotatably mounting the rolls on the tractor, an elevator independent of the husking sections extending along the rolls at a steeper slope than the rolls so as to have its lower end lower than the lower end of the rolls and its upper end higher than the upper ends of the rolls and serving to move corn ears snapped by the snapping sections to the upper end of the husking sections to enable the ears to move downwardly from the upper end of the husking sections along the husking sections for husking, means mounting the elevator upon the tractor, a wall extending transversely across the rolls at the juncture between the husking sections and the snapping sections for preventing husked ears having moved downwardly along the husking sections from passing onto the snapping sections, means mounting the wall on the tractor, a conveyor extending from beneath the lower end of the husking sections and forwardly of the rear axle rearwardly beneath the rear axle to the rear of the rear axle, and means mounting the second conveyor on the tractor.

13. In a corn-picking machine and in combination, a pair of snapping rolls, a pair of aligned husking rolls, supporting means for rotatably mounting said rolls, and means for conveying ears of corn removed by the snapping rolls directly and out of contact with the husking rolls to the end of the husking rolls remote from said snapping rolls, and means between said pairs of rolls for deflecting the husked ears.

14. In a corn-picking machine and in combination, a pair of rolls each including a snapping section and a husking section, supporting means for rotatably mounting said rolls, and means for conveying ears of corn removed by the snapping sections directly and out of contact with the husking sections to the end of the husking section remote from said snapping section, and means between said sections for deflecting the husked ears.

15. The combination with a rotatable snapping means, a rotatable husking means, and means mounting the snapping means and the husking means so that axes of rotation of the snapping means and the husking means are generally in alinement and have the same slope, and the snapping means is lower than the husking means, of means for conveying ears of corn snapped by the snapping means directly and out of contact with the husking means to the end of the husking means away from the snapping means and higher than the remainder of the husking means, whereby the ears of corn may move downwardly along the husking means in the direction toward the snapping means during husking, and means at the lower end of the husking means for deflecting the husked ears.

JOHN L. AASLAND.